(12) United States Patent
Ku et al.

(10) Patent No.: US 10,364,189 B2
(45) Date of Patent: Jul. 30, 2019

(54) METHODS FOR FORMING CERAMIC CORES

(71) Applicant: General Electric Company, Schenectady, NY (US)

(72) Inventors: Anthony Yu-Chung Ku, Rexford, NY (US); Xi Yang, Mason, OH (US); Tao Li, Cincinnati, OH (US); John Patrick Pollinger, Niskayuna, NY (US); Zachary Kenneth Mowry, Beavercreek, OH (US); Frederic Joseph Klug, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 15/586,390

(22) Filed: May 4, 2017

(65) Prior Publication Data

US 2018/0319711 A1 Nov. 8, 2018

(51) Int. Cl.
*C04B 35/185* (2006.01)
*C04B 41/53* (2006.01)
(Continued)

(52) U.S. Cl.
CPC .............. *C04B 35/185* (2013.01); *B28B 1/24* (2013.01); *B28B 7/42* (2013.01); *B28B 11/243* (2013.01); *C04B 35/64* (2013.01); *C04B 41/009* (2013.01); *C04B 41/0072* (2013.01); *C04B 41/80* (2013.01); *C22C 9/10* (2013.01); *C04B 2111/0087* (2013.01); *C04B 2111/00939* (2013.01); *C04B 2235/3217* (2013.01); *C04B 2235/483* (2013.01); *C04B 2235/6567* (2013.01); *C04B 2235/6581* (2013.01); *C04B 2235/662* (2013.01); *C04B 2235/75* (2013.01); *C04B 2235/80* (2013.01); *C04B 2235/9669* (2013.01); *C04B 2235/9676* (2013.01)

(58) Field of Classification Search
CPC ......... B22C 9/10; B22C 9/103; C04B 35/185; C04B 41/002; C04B 41/009; C04B 41/0072; C04B 41/4515; C04B 41/4519; C04B 41/4556
USPC ........................................................ 264/645
See application file for complete search history.

(56) References Cited

U.S. PATENT DOCUMENTS 3,824,113 A 7/1974 Loxley et al.
3,972,367 A 8/1976 Gigliotti, Jr. et al.
(Continued)

OTHER PUBLICATIONS

Ming et al., "Effect of Mullite on High Temperature Anti-deforming Capability of Alumina-based Ceramic Core", Journal of Materials Engineering, 2006, 3 Pages.
(Continued)

*Primary Examiner* — Tri V Nguyen
(74) *Attorney, Agent, or Firm* — Dority & Manning, P.A.

(57) ABSTRACT

Methods for forming ceramic cores are disclosed. A ceramic core formed using the method of the present application includes a silica depletion zone encapsulating an inner zone. The inner zone includes mullite and the silica depletion zone includes alumina. The method includes heat-treating a ceramic body in a non-oxidizing atmospheric condition for an effective temperature and time combination at a pressure less than $10^{-2}$ atmosphere to form the silica depletion zone at a surface of the ceramic core.

17 Claims, 6 Drawing Sheets

(51) Int. Cl.
*B28B 1/24* (2006.01)
*B28B 11/24* (2006.01)
*C04B 35/64* (2006.01)
*C04B 41/00* (2006.01)
*B28B 7/42* (2006.01)
*C04B 41/80* (2006.01)
*C22C 9/10* (2006.01)
*C04B 111/00* (2006.01)

(56) References Cited

U.S. PATENT DOCUMENTS

| | | | |
|---|---|---|---|
| 4,031,945 A * | 6/1977 | Gigliotti, Jr. | 148/404 |
| 4,156,614 A | 5/1979 | Greskovich et al. | |
| 4,677,095 A | 6/1987 | Wan et al. | |
| 4,837,187 A | 6/1989 | Frank et al. | |
| 5,580,837 A | 12/1996 | Dodds et al. | |
| 6,025,065 A * | 2/2000 | Claussen | C04B 35/117 |
| | | | 419/10 |
| 6,494,250 B1 | 12/2002 | Frank et al. | |
| 7,487,819 B2 | 2/2009 | Wang et al. | |
| 7,798,201 B2 | 9/2010 | Bewlay et al. | |
| 7,938,168 B2 | 5/2011 | Lee et al. | |
| 2004/0023788 A1 * | 2/2004 | Mehrotra | C04B 35/10 |
| | | | 501/95.3 |
| 2015/0225302 A1 * | 8/2015 | Cai | B82Y 30/00 |
| | | | 55/523 |
| 2016/0175923 A1 | 6/2016 | Liu et al. | |
| 2017/0144216 A1 * | 5/2017 | Yang | B22C 9/10 |

OTHER PUBLICATIONS

Wu et al., "Gelcasting of alumina based ceramic cores containing yttria for single crystal and directional solidification blades", Advances in Applied Ceramics, vol. 108, Issue: 7, 2009, pp. 406-411.

* cited by examiner

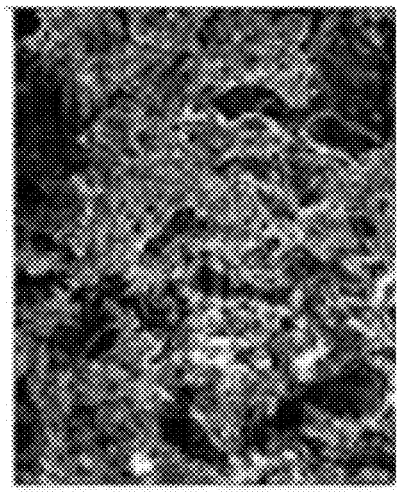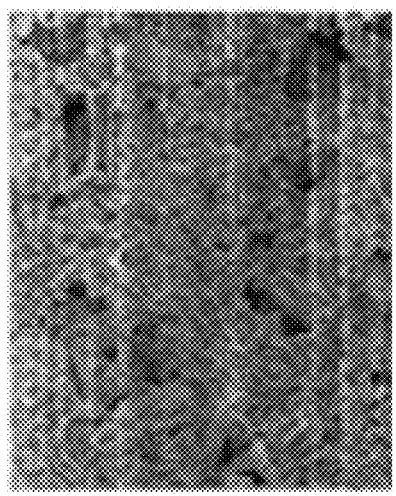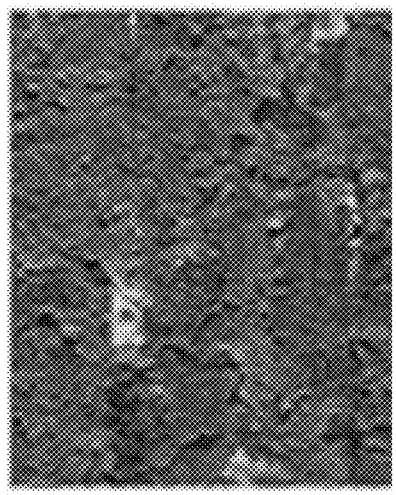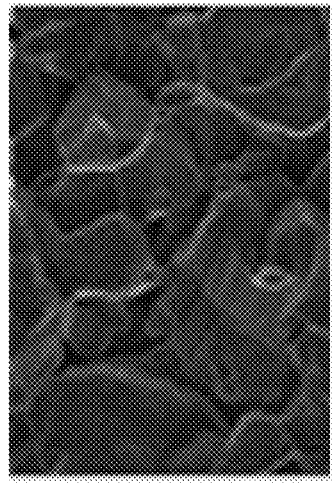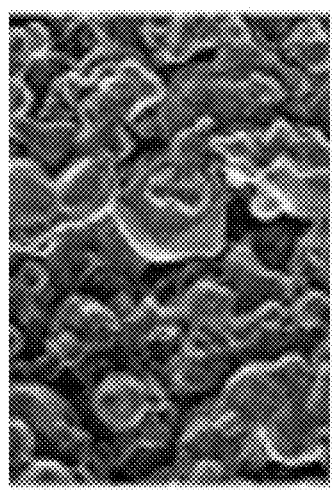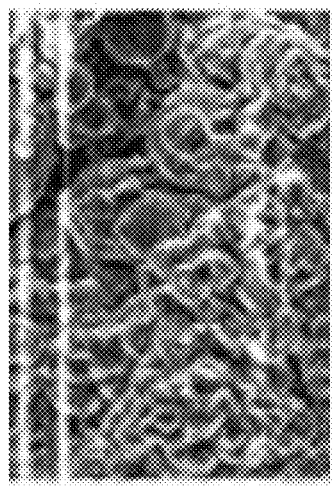

METHODS FOR FORMING CERAMIC CORES

BACKGROUND

The present specification generally relates to methods for forming ceramic cores used in investment casting. Specifically, the present specification relates to methods for forming ceramic cores that have a silica depletion zone.

Investment casting often utilizes cores to produce internal channels inside cast metals. A molten metal or alloy is poured into a mold containing a core. After the metal solidifies, the core is removed to leave behind the internal channels. The architecture of the internal channels is determined by the features of the core.

Cores formed through injection molding and other conventional processes can produce simple hollow channel architectures. However, in some applications, such as cast blades for gas turbines, more complex channel geometries are desirable due to their improved blade performance, where air is blown through the hollow channels of the cast blade for cooling. Improved blade cooling performance can take the form of reduced cooling air flow, which allows for increased utilization of air for combustion and thus increases engine thrust. Higher blade cooling performance allows for an increase in combustor operating temperature and improved thermodynamic efficiency, resulting in better specific fuel consumption, while still maintaining turbine blade component temperatures within an acceptable range for durability. A major limitation to commercial implementation of these representative cooling circuits in turbine blades is the inability to produce the necessary ceramic cores as single piece articles by conventional molding techniques.

In some methods, disposable core die (DCD)s may be utilized to produce cores with both simple and complex channel architectures. In these methods, the core is formed by injecting a slurry containing ceramic particles, fugitive species, and an organic binder into a disposable core die. The slurry is subsequently cured and then fired to produce a solidified ceramic core. The disposable core is removed before, during, or after the core firing process, for instance by a chemical, thermal or mechanical process.

Ceramic core materials used in the investment casting industry are predominantly made of silica ($SiO_2$). Silica is a commonly used core material in investment casting because of its high processability, low coefficient of thermal expansion, high-temperature dimensional stability, and ease of removal from the casting. Articles made by investment casting generally include cast metals or metal alloys. In some instances, alloying elements, such as aluminum, nickel, chromium, yttrium, zirconium, etc., used in the investment casting may react with the conventional silica-based ceramic core and cause deleterious effects, such as, for example, internal oxidation. The oxidation and loss of aluminum, nickel, chromium, yttrium and/or zirconium may cause rejection of an expensive casting. In addition, reaction between the alloying elements and the ceramic core may cause the ceramic core and the metal casting to tightly bond with each other and make the ceramic core more difficult to remove.

Yttrium addition to an alloy is known for improving oxidation resistance of nickel-based superalloys at the service temperature of turbine airfoils. However, yttrium can react with silica during casting, thereby resulting in depletion of the yttrium in the alloy and introduction of undesirable components into the alloy that debit the mechanical properties. Reaction between nickel-based superalloys with silica-based ceramic core is a major limitation in using silica cores for the casting of these (reactive) nickel-based superalloys. Alumina and yttria materials have been used in ceramic cores to reduce or eliminate this reactivity problem. Alumina, for instance, is less reactive with reactive elements such as, for example, yttrium, in comparison with silica. However, alumina requires higher processing temperatures for processing than silica-based materials. Therefore, it is desirable to have an improved ceramic core and a process for forming the same for investment casting of reactive metals and alloys.

BRIEF DESCRIPTION

In one aspect, a method for forming a ceramic core is disclosed. The method includes heat-treating a ceramic body in a non-oxidizing atmospheric condition for an effective temperature and time combination to form a silica depletion zone at a surface of the ceramic core. The non-oxidizing atmospheric condition has a pressure less than $10^{-2}$ atmosphere. The ceramic body that is subjected to the heat-treating includes mullite.

In yet another aspect, a method for forming a ceramic core is disclosed. The method includes providing a slurry, injecting the slurry into a die, curing the slurry in the die to form a cured ceramic body, separating the die and the cured ceramic body, sintering the cured ceramic body to form the ceramic body, and heat-treating the ceramic body in a non-oxidizing atmospheric condition, for a temperature greater than 1600 degree Celsius for a time duration greater than 2 hours to form a silica depletion zone encapsulating an inner zone comprising alumina and mullite. The slurry includes a precursor of silica and at least one of alumina or a precursor of alumina. The formed ceramic body includes mullite. The non-oxidizing atmospheric condition has a pressure less than $10^{-3}$ atmosphere.

DRAWINGS

Various features, aspects, and advantages of the present specification will become better understood when the following detailed description is read with reference to the accompanying drawings in which like characters represent like parts throughout the drawings. Unless otherwise indicated, the drawings provided herein are meant to illustrate only the key features of the present specification. These key features are believed to be applicable in a wide variety of systems which comprises one or more embodiments of the present specification. As such, the drawings are not meant to include all conventional features known to those of ordinary skill in the art to be required for practicing the present specification.

FIG. 3A shows a scanning electron microscopy (SEM) image of a surface of a silica ceramic body before heat-treating, in accordance with some embodiments of the present specification.

FIG. 3B shows an SEM image of a surface of the silica ceramic body after heat-treating at 1500° C. for 8 hours, in accordance with some embodiments of the present specification.

FIG. 3C shows an SEM image of a surface of the silica ceramic body after heat-treating at 1550° C. for 8 hours, in accordance with some embodiments of the present specification.

FIG. 4A shows an SEM image of surface of a high-silica mullite ceramic body before heat-treating, in accordance with some embodiments of the present specification.

FIG. 4B shows an SEM image of a surface of the high-silica mullite a ceramic body after heat-treating at 1500° C. for 8 hours, in accordance with some embodiments of the present specification.

FIG. 4C shows an SEM image of a surface of the high-silica mullite ceramic body after heat-treating at 1550° C. for 8 hours, in accordance with some embodiments of the present specification.

DETAILED DESCRIPTION

Each embodiment presented below facilitates the explanation of certain aspects of the present specification, and should not be interpreted as limiting the scope of the present specification. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, considering that in some circumstances, the modified term may sometimes not be appropriate, capable, or suitable.

The present specification provides a ceramic core and methods for preparing the ceramic core. The ceramic core, in combination with a shell mold, is suitable for use in a casting process to produce metal alloy components. The casting process makes use of the ceramic core. The ceramic core includes an exterior silica depletion zone encapsulating an inner zone. The inner zone includes predominantly alumina and mullite and the silica depletion zone includes predominantly alumina. The silica depletion zone is less reactive than the inner zone in the presence of common alloying elements. The ceramic core is easily processable, while reducing the likelihood of reaction with a reactive metal alloy.

Figure 1:
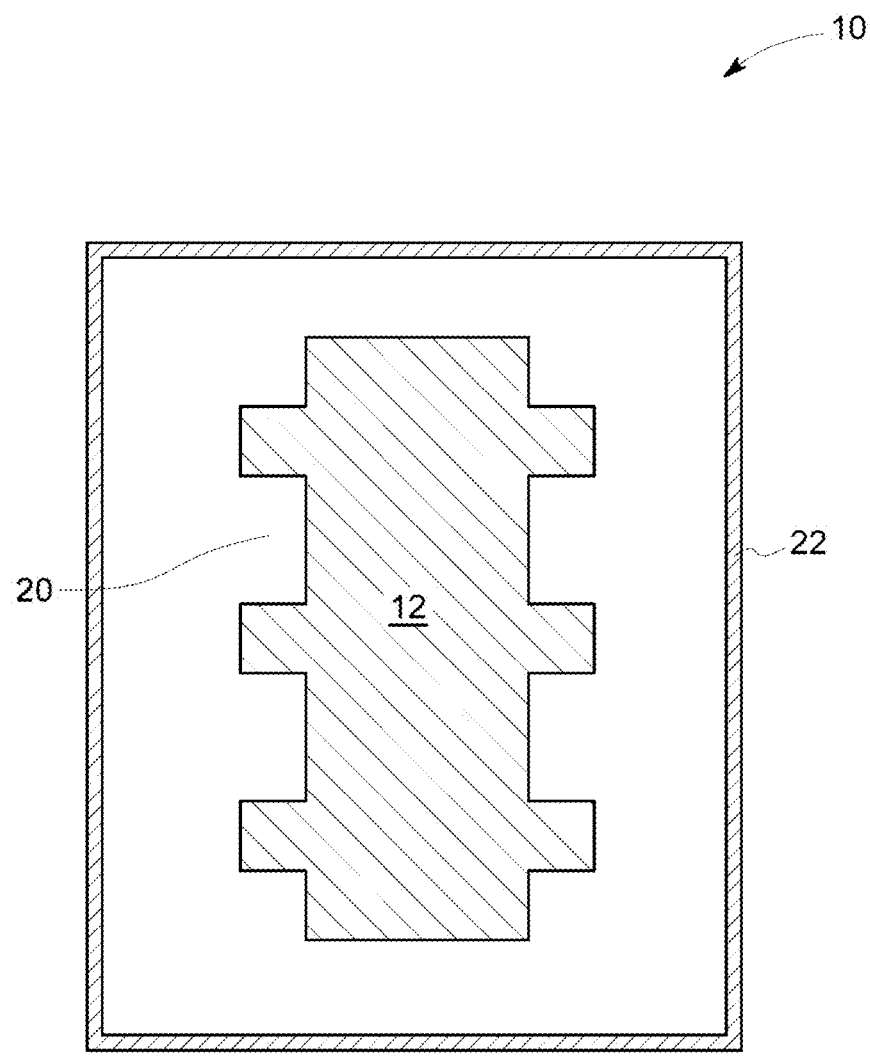
FIG. 1 illustrates a mold assembly suitable for investment casting a component, in accordance with some embodiments of the present specification.

FIG. 1 represents a mold assembly 10 suitable for investment casting a component in accordance with one embodiment of the present specification. FIG. 1 has a ceramic core 12 and a shell mold 22. The mold assembly 10 is suitable for investment casting of components with complex cavities. According to some aspects of the present specification, the mold assembly 10 is particularly adapted for casting reactive metals or reactive metal alloys, non-limiting examples of reactive metal alloys include steels (including stainless steels), superalloys, titanium-based alloys, etc., though it is foreseeable that the present specification could be employed with other alloy systems. In certain embodiments, the metal alloys include alloying elements that react at high temperatures with silica ($SiO_2$), including casting temperatures at which such alloys are present in a molten state, for example, at temperatures above 1540° C.

The mold assembly 10 has the shell mold 22 as the outermost member of the assembly 10, and the core 12 is within a cavity defined by the shell mold 22. Situated between the shell mold 22 and the core 12 is a pattern 20 defined by the cavity between the shell 22 and the ceramic core 12. The pattern 20 corresponds to the shape of a component to be cast from the reactive metal alloy, as represented in FIG. 1. A melt of the metal or metal alloy that is used to form the component is poured in the pattern 20 defined by the shell mold 22 and core 12. The shell mold 22 and the core 12 can be used in substantially conventional investment casting processes, as well as other types of casting processes, and as such the casting process itself will not be discussed in any detail.

Figure 2:
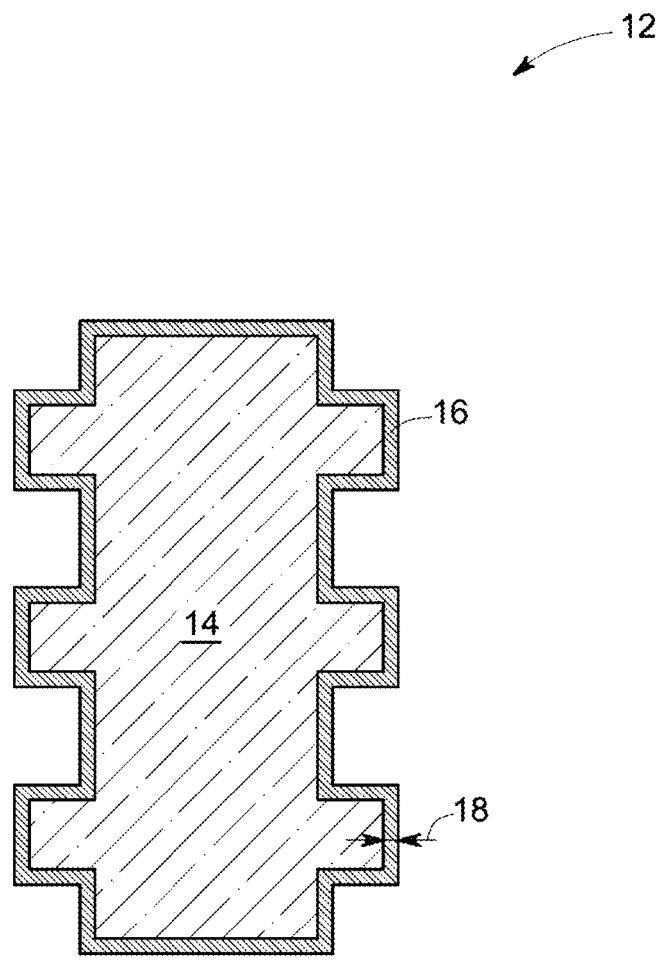
FIG. 2 illustrates a ceramic core having a silica depletion zone encapsulating an inner zone, in accordance with some embodiments of the present specification.

As mentioned above, silica-containing compositions are desirable for use in the ceramic cores due to their high processability and thereby, the ease of forming the ceramic core. However, at elevated temperatures silica either in the form of free silica or as a part of a silica-containing composition, reacts with certain elements in the metal alloy, such as aluminum, nickel, chromium, yttrium, zirconium, etc., which may cause surface depletion effects that can adversely affect the desired properties of the resultant component that is formed from the metal or metal alloy. Loss of these reactive alloying elements from the metal alloy may also cause the ceramic core 12 and the formed metal component to react with each other and tightly bound together, as a result the ceramic core 12 may be more difficult to remove from the formed metal component. A product of the oxidation reaction between reactive alloying elements and silica is silicon monoxide (SiO), which is gaseous at pour temperature and may get trapped in the component and form gas defects. Therefore, in certain embodiments of the present specification, the ceramic core 12 of the mold assembly 10 includes a silica depletion zone 16 as an exterior zone encapsulating a silica-containing inner zone 14, as shown in FIG. 2.

In some embodiments, the ceramic core 12 is a monolithic ceramic core. As used herein, the term "monolithic ceramic core" refers to a ceramic core that does not contain any detectable coatings, joints, or breaks. The monolithic ceramic core is constructed as a single piece during manufacturing. The monolithic ceramic core does not have any joints that are formed after preparation of individual, macrostructural parts of the ceramic core. In particular, the monolithic ceramic core is not formed by initially preparing the macrostructural parts and then joining them by using any physical, chemical, and/or mechanical means.

The composition of the inner zone 14 is mainly selected on the basis of ease of forming the ceramic core 12, sufficient room temperature strength to withstand pressures during processing, and a sufficient elevated temperature strength and creep resistance to withstand the stresses due to non-uniform metal flow during casting. The silica depletion zone 16 of the ceramic core 12 is formed on the exterior surface of the inner zone 14 and reduces the likelihood of reaction between the inner zone 14 and the alloying elements. The composition and properties of the silica depletion zone 16 are selected to minimize undesirable reactions between the inner zone 14 and a molten metal or alloy (melt) during the casting process.

The inner zone 14 includes a silica-containing composition. In some embodiments, the inner zone 14 of the ceramic core 12 includes alumina and mullite. In some embodiments, the inner zone 14 includes alumina, mullite and free silica. In some embodiments, the inner zone 14 includes at least 50 volume percent of mullite and at least 20 volume percent of alumina. In some embodiments, an amount of free silica ($SiO_2$) in the inner zone 14 is less than 10 volume percent of the inner zone 14. In some embodiments, most of the silica present in the inner zone 14 exists as a part of the composition of mullite, instead of in the form of free silica. In certain embodiments, the free silica present in the inner zone 14 is less than 5 volume percent of the inner zone 14.

The silica depletion zone 16 is present on the outer surface of the inner zone 14 to address the undesirable effects of silica, such as, for example, reaction of silica with the cast metal or alloy melt. The silica depletion zone 16 at least partially covers the inner zone 14 of the ceramic core 12. In some embodiments, the silica depletion zone 16 substantially covers the inner zone 14 such that the reactivity of the molten metal or molten metal alloy of the component with the inner zone 14 is lowered to a level that would not affect the removal of the component from the mold assembly 10. In certain embodiments, the silica depletion zone 16 covers the entire inner zone 14 in the ceramic core 12 and shields the inner zone 14 from the molten metal or molten metal alloy.

According to some embodiments, the silica depletion zone 16 includes alumina in an amount of at least 90 volume percent of the silica depletion zone 16. In some embodiments, the silica depletion zone 16 is substantially free of free silica. In some embodiments, the silica depletion zone 16 is further free of mullite ($3Al_2O_3$-$2SiO_2$) composition. In certain embodiments, the silica depletion zone 16 is of predominantly alumina ($Al_2O_3$) composition. In one example, the silica depletion zone has more than 99 volume percent of alumina. Although a ceramic core 12 having alumina in the exterior part would be difficult to remove from the component, presence of the silica depletion zone 16 on the surface of the inner zone 14 strengthens the ceramic core 12 as alumina does not devitrify and distort during the casting process. To be an effective barrier layer by effectively stopping the melt of metal or metal alloys from contacting the silica-containing inner zone 14 at the operating temperature during casting process, in some embodiments, the silica depletion zone 16 has a depth (i.e. thickness) 18 (FIG. 2) of at least 50 microns. In certain embodiments, the silica depletion zone 16 has the depth 18 of at least 100 microns. In certain embodiments, the silica depletion zone 16 has the depth 18 of at least 500 microns.

The ceramic core 12 is compatible with the disposable core die process. Further, the ceramic core 12 is substantially non-reactive during casting, and allows for production of structures with intricate internal shapes while possessing the compatibility with the alloy sought for articles formed by investment casting. In summary, the ceramic core 12 satisfies the property requirements of the ceramic core of the DCD process, such as room temperature strength for handling, high temperature strength and creep resistance for casting, low density (i.e., sufficient porosity) to limit compressive strength to avoid hot cracking and metal recrystallization. Further, the ceramic core allows effective removal, such as, for example, by leaching, in a practical time period under practical temperature and pressure conditions.

In one aspect, the present specification relates to a method for producing the ceramic core 12 for investment casting of reactive materials. The method includes heat-treating a ceramic body having mullite for an effective temperature and time combination in a non-oxidizing atmospheric condition at a pressure less than $10^{-2}$ atmosphere. In some embodiments, the pressure of the non-oxidizing condition is less than $10^{-3}$ atmosphere and in certain embodiments, the pressure of the non-oxidizing condition is less than $10^{-4}$ atmosphere. In some embodiments, the method includes heat-treating the ceramic body having mullite at a determined temperature for a determined time in a non-oxidizing atmospheric condition. This heat-treating forms a silica depletion zone at a surface of the ceramic body. In certain embodiments, the method includes heat-treating a ceramic body having alumina, mullite, and free silica at a determined temperature for a determined time in a non-oxidizing atmospheric condition at a pressure less than $10^{-2}$ atmosphere.

Initially, prior to commencement of the method, mullite is present throughout the ceramic body. In some embodiments, the ceramic body may additionally have at least one of alumina or silica. In certain embodiments, the ceramic body has alumina, mullite, and free silica throughout the ceramic body. In some embodiments, the ceramic body is a sintered ceramic body in which starting constituents have undergone reactions at high temperatures to form the components of the ceramic body. Amounts of alumina and/or free silica relative to, mullite at the ceramic body are a result of the starting constituents and the heat-treatment that the starting constituents underwent during formation of the ceramic body.

The ceramic body having mullite is heat-treated at an effective temperature and time combination in a non-oxidizing atmospheric condition. The effective temperature and time duration of heat-treating is determined based on the temperature and time required for the formation of the ceramic core having an outer silica depletion zone encapsulating an inner zone containing silica, in a particular non-oxidizing atmosphere. In some embodiments, the effective temperature of heat-treating the ceramic body is greater than 1400° C. In certain embodiments, the effective temperature of heat-treating the ceramic body is in a range from 1500° C. to 1700° C. The time duration for the heat-treating is long enough for the creation of the silica depletion zone. In some embodiments, the time duration for the heat-treating at a temperature greater than 1400° C. is greater than one hour. In some embodiments, the time duration for the heat-treating at a temperature in between 1500° C. and 1700° C. is greater than one hour. In some embodiments, the time duration for the heat-treating at a temperature in between 1500° C. and 1700° C. is greater than 12 hours.

The non-oxidizing atmospheric condition includes vacuum. In some embodiments, a vacuum is a low pressure atmospheric condition having a pressure less than $10^{-2}$ atmosphere. As used herein, "heat-treating a ceramic body in a non-oxidizing atmospheric condition having pressure less than $10^{-2}$ atmosphere" refers to the atmospheric condition that has a pressure less than $10^{-2}$ atmosphere and further does not promote the oxidation of the ceramic body. Heat treating the ceramic body in vacuum directly removes silica ($SiO_2$) as volatile silicon monoxide (SiO). In some embodiments, a partial pressure of oxygen in the non-oxidizing atmospheric condition having pressure less than $10^{-2}$ atmosphere is less than $10^{-4}$ atmosphere. In some embodiments, the non-oxidizing atmospheric condition comprises a reducing atmospheric condition. Non-limiting examples of the reducing atmospheric condition include carbon monoxide, methane, hydrogen, or a combination of any two or more of the foregoing. Thus, "heat-treating a ceramic body in a reducing atmospheric condition having pressure less than $10^{-2}$ atmosphere" refers to the atmospheric condition that has a pressure less than $10^{-2}$ atmosphere and further aids in reducing silica to silicon monoxide or silicon (Si). In certain embodiments, the ceramic body is subjected to heat-treating under carbon monoxide atmosphere at pressure less than $10^{-2}$ atmosphere, thus subjecting the ceramic body to a carbothermal reduction in vacuum. During carbothermal reduction in vacuum, a carbothermal reaction may occur between silica and carbon monoxide (CO) to form silicon monoxide and carbon dioxide ($CO_2$). In some embodiments, the carbothermal reduction in vacuum is found to be advantageous for the removal of silica. In some embodiments, the ceramic body is subjected to heat-treating at pressure less than $10^{-2}$ atmosphere in the presence of carbon. The carbon may be present in the form of solid block of carbon, carbon powder, or carbon heating elements. Heat-treating the ceramic body at vacuum in the presence of carbon was found to have an unexpected result of being particularly advantageous in removing silica from mullite and converting mullite into alumina.

The ceramic body having mullite, and optionally at least one of alumina or free silica may be prepared using various methods. One example method for preparing the ceramic body is by slurry processing. In slurry processing, a slurry may be formed using a precursor of silica along with at least one of a fine powder of alumina or a precursor of alumina. The formed slurry may be injected into a die and cured to form a cured ceramic body in the die. The die and the cured ceramic body may be separated and the cured ceramic body may be sintered to form the ceramic body. The ceramic body thus formed includes alumina, mullite, and free silica.

In an example method of preparing the ceramic body by slurry processing, the slurry used for forming the ceramic body has a viscosity that allows low-pressure injection molding in thin-wall disposable plastic molds without bursting or bloating. Further, the viscosity of the slurry and yield stress are designed to allow for handling and fabricating the part after injection, without excessive settling, thereby avoiding inhomogeneity of ceramic content, differential shrinkage, and the like. In some embodiments, the slurry is designed such that formed ceramic body has adequate strength in its green state and low enough shrinkage during curing and firing so that desired dimensional tolerance may be maintained during the production of the ceramic core 12.

In some embodiments, the slurry used for forming the ceramic body includes alumina particles and a siloxane binder. Use of siloxane binder reduces the presence of free silica in the ceramic core 12. Particle sizes and shapes of the alumina particles may be tailored to blend with the siloxane binder to form slurry of desired consistency. For instance, various measured particle sizes and morphologies of alumina may be mixed together in certain ratios to obtain specific slurry characteristics. The particle sizes may be described by the ceramic industry practice of citing the D50 value in microns (particle size volume median value). In some embodiments, the D50 size of the alumina particles is up to 150 microns. In some embodiments, the D50 size is up to 100 microns or is up to 50 microns. In certain embodiments, the D50 size range is between 3 microns and 150 microns. In some embodiments, the alumina particles have multimodal particle sizes with an overall size range in between submicrons and 150 microns.

Various siloxane binders may be utilized that provide for the desired characteristics of the resulting slurry in the example method of forming the ceramic body. The term "siloxane binder" as used herein includes both single component binders and mixtures of more than one binder. The use of either a single component or a mixture of components for the binder allows for tailoring of various features, such as viscosity or silica yield. The composition is typically a slurry that includes ceramic powders dispersed within a silicon-bearing liquid; the liquid may also be referred to as a "binder" in the parlance of slurry techniques. In particular, the liquid includes a siloxane species, for instance, (a) one or more siloxane polymers-such as (but not limited to) the so-called "Room Temperature Vulcanizable," (RTV) systems well known in the silicones art, as well as other such silicone formulations that contain polymeric inputs; (b) siloxane monomers; and/or (c) siloxane oligomers. The siloxane species may include alkenyl and hydride functionalities. The siloxane species used in the liquid is of a type referred to in the art as "curable" or "reactive," meaning that under a given set of processing conditions, the species will undergo a cross-linking ("curing") reaction.

An example siloxane species having alkenyl functionalities that may be used as a binder liquid in the composition described herein are alkenyl siloxanes of the general formula (I):

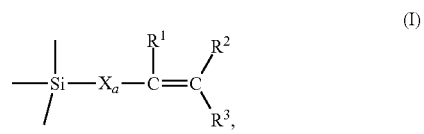

wherein $R^1$, $R^2$, and $R^3$ each independently comprise hydrogen or a monovalent hydrocarbon, halocarbon, or halogenated hydrocarbon radical; X a divalent hydrocarbon radical; and a is a whole number having a value between 0 and 8, both inclusive. The terms "monovalent hydrocarbon radical" and "divalent hydrocarbon radical" as used herein are intended to designate straight chain alkyl, branched alkyl, aryl, aralkyl, cycloalkyl, and bicycloalkyl radicals. Further, non-limiting examples of useful siloxanes may include polyfunctional olefinic substituted siloxanes, suitable alkyl/alkenyl cyclosiloxanes, suitable functional unsaturated siloxanes, suitable polyfunctional hydride siloxanes, or suitable alkyl/hydride cyclosiloxanes.

A ratio of alumina to siloxane binder in the slurry may be designed to yield the ceramic body comprising alumina, mullite and silica, after sintering step. In some embodiments, an amount of alumina in the slurry relative to the total weight of alumina and siloxanes is greater than 50 weight percent. In some embodiments, the weight percent of alumina in the slurry relative to the total weight of alumina and siloxanes is between 55 weight percent and 80 weight percent.

The viscosity of the liquid binder, theoretical cross-link density of the binder, and resultant silica char yield may be adjusted using appropriate siloxane species and stoichiometric ratio of total hydride to alkenyl reactive functional groups. For instance, the viscosity of the composition can vary from about 1 to about 6000 centipoises, in some embodiments from about 1 to about 300 centipoises, and in particular embodiments from about 1 to about 100 centipoises.

Other additives that may be present in the slurry include, but are not limited to, catalysts, dispersants and fugitive materials. Fugitive materials may be removed during firing to produce porosity in the ceramic core. For the purposes of this present specification, a fugitive material is an organic or an inorganic material that is combustible under the high-temperature firing disclosed herein and the resulting gases or volatile liquids leave the fired body. Examples of such fugitive materials include, but are not limited to, polyolefin (e.g., polyethylene, polypropylene, polystyrene) spherical beads, and graphite or glassy carbon powders.

This slurry is then transferred, before hardening due to cross-linking, into a die of desired shape for the resulting ceramic core. Traditional metal dies or disposable thin wall core die technology may be used for this process, as may injection molding or any other type of conventional molding. In some embodiments, the slurry is poured or injected into a disposable core die.

Once the slurry is transferred into the die, the slurry may be cured to form a solidified article, that is, a green body. In some embodiments, the temperature for curing is between 25° C. and 110° C. In other embodiments, the temperature for curing is between 40° C. and 80° C. In some embodiments, the time for curing is between 1 hour and 24 hours. As a non-limiting example, the curing step may be performed for approximately 2 hours at 50° C. As another non-limiting example, the curing step may be for approximately 24 hours at 35° C.

In some embodiments, the conversion from cured ceramic body to the ceramic body occurs in a two-step firing process. The first low-temperature firing step converts the silicon present in the siloxane binder to amorphous silica. This "low fire" step, in some embodiments, further burns off the die. In some embodiments, the first step is performed for between 10 and 20 hours. In some embodiments, the first step is performed for between 12 and 18 hours. In other embodiments, the first step is performed for approximately 16 hours. In some of these embodiments, the first temperature is between 250° C. and 750° C., or the first temperature is between 350° C. and 650° C. In other embodiments, the first temperature is between 400° C. and 600° C., or the first temperature is between 450° C. and 550° C.

The core then undergoes sintering step that reduces presence of free silica in the ceramic core. In the sintering step, the amorphous silica in combination with some part of the alumina is converted to mullite. In some embodiments, the temperature of sintering is greater than 1200° C. In other embodiments, the temperature of sintering is in between 1450° C. and 1700° C. In some other embodiments, the time utilized for sintering is between 1 hour and 24 hours. In some embodiments, the time utilized for sintering is between 1 hour and 12 hours. In some embodiments, the time utilized for sintering is between 1 hour and 6 hours.

The formed ceramic body includes mullite. Majority of the silicon-containing constituents initially present in the slurry in the form of siloxane binders are converted to the silicon-containing ceramic phase mullite in the ceramic body. In some embodiments, some part of the silicon-containing constituents may be present in the form of free silica. It is to be understood that the thermally-converted slurry may also include other materials, such as, for example, other $Al_2O_3$—$SiO_2$ polyforms or a silica glass.

The ceramic body thus formed is subjected to heat-treating as explained earlier to form the ceramic core having the silica depletion zone on the inner zone, such that the outer surface of the ceramic core does not have enough quantity of free silica to react with the metals or metal alloys of the investment casting. The formed ceramic core includes a silica depletion zone encapsulating an inner zone, wherein the inner zone includes mullite, and the silica depletion zone includes alumina. The method of forming the ceramic core includes the steps of heat-treating a ceramic body having mullite in a non-oxidizing atmospheric condition for an effective temperature and time combination at less than $10^{-2}$ atmosphere pressure to form a silica depletion zone at a surface of the ceramic core. Further, in some embodiments, the silica depletion zone of the formed ceramic core is substantially free of mullite, and free silica. Thus, in some embodiments, the method for forming the ceramic core is effective in removing silica that is present as a part of the composition of mullite in the sintered ceramic body by converting mullite into alumina, so that the outer surface is completely free of silica (either in the form of free silica or in the bounded form, such as, for example, mullite). Further, since the ceramic core is formed as a single piece using slurry processing, curing, sintering and heat-treating, in some embodiments, the formed ceramic core is in a monolithic form.

EXAMPLES

The examples presented herein are intended to be merely illustrative, and should not be construed to be any sort of limitation on the scope of the claimed present specification. Unless specified otherwise, all the components are commercially available from common chemical suppliers.

Example 1

Three ceramic bodies were taken as mentioned below:
(i) a first, "silica" ceramic body having silica and zircon, but is free of alumina;
(ii) a second, "high-silica mullite" ceramic body of alumina-mullite-silica sample having about 6 to 9 wt % silica; and
(iii) a third, "low-silica mullite" ceramic body of alumina-mullite-silica sample having less than or equal to 2 wt % silica.

The ceramic ore materials were heat-treated in a vacuum furnace with graphite heating elements at a pressure less than $10^{-4}$ atmosphere.

Tests were performed using three different heat treatment conditions. For each test, the mass of the first, second and third samples before and after heat treatment were recorded and used to calculate the percent mass loss. The mass losses for each sample and heat treatment condition are listed in Table 1.

TABLE 1

Mass loss of different ceramic bodies after heat treatment in a furnace having graphite heating elements

| Sample | Starting material wt. % silica | % mass loss after 1500° C./8 h | % mass loss after 1500° C./24 h | % mass loss after 1550° C./8 h |
|---|---|---|---|---|
| Silica | | 18% | 10% | 20% |
| High-silica mullite | 6-9% | 2% | 2% | 11% |
| Low-silica mullite | <2% | 2% | 2% | 13% |

The data show significant mass loss from the silica sample in all cases, confirming the efficacy of the heat-treatment in removing silica. The lower effective mass loss from the 1500° C./24 h test relative to the 1500° C./8 h test was due to deposition of a small amount of black, carbonaceous material on the 24 h-treated sample during the heat treatment.

Mass loss was observed in both high-silica mullite and low-silica mullite samples over all the conditions. The amounts were comparable to each other, and increase in temperature had a much greater effect than soak time at a particular temperature in increasing the mass loss. The mullite samples heated at 1550° C./8 h showed mass losses higher than expected, if free silica were the only material removed. Additional microstructural analysis indicated at least partial decomposition of the mullite and removal of the silica content associated with the mullite.

FIG. 3A shows the surface microstructure of the first "silica" ceramic body sample before heat-treatment, and FIGS. 3B and 3C respectively show the first "silica" ceramic body sample after heat-treating at 1500° C. for 8 hours and at 1550° C. for 8 hours respectively. The surface microstructures were captured using scanning electron microscopy (SEM) at a magnification of 1000×. Significant pitting of the surface in both the heat-treated samples were observed as seen in the FIGS. 3B and 3C.

Figure 5C:
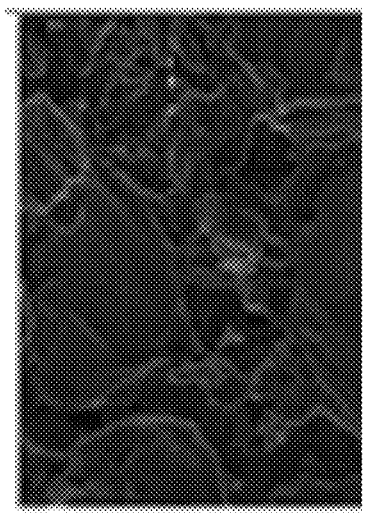
FIG. 5C shows an SEM image of a surface of the low-silica mullite ceramic body after heat-treating at 1550° C. for 8 hours, in accordance with some embodiments of the present specification.
Figure 5B:
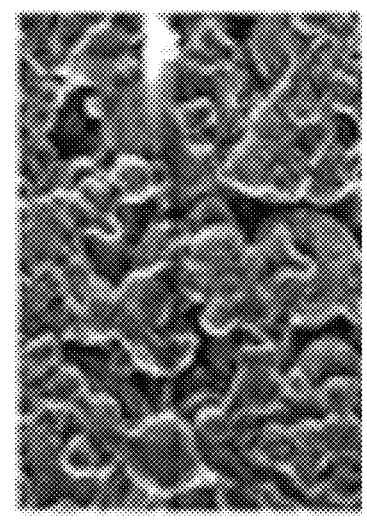
FIG. 5B shows an SEM image of a surface of the low-silica mullite a ceramic body after heat-treating at 1500° C. for 8 hours, in accordance with some embodiments of the present specification.
Figure 5A:
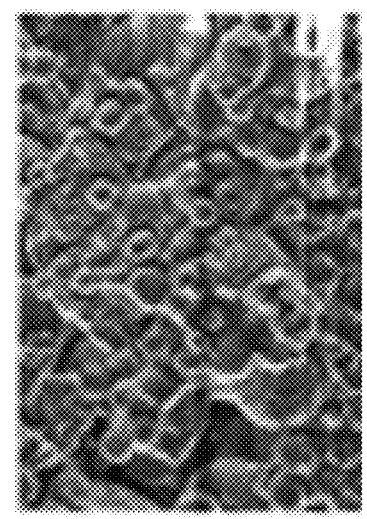
FIG. 5A shows an SEM image of a surface of a low-silica mullite ceramic body before heat-treating, in accordance with some embodiments of the present specification.

FIGS. 4A, 4B, and 4C are the surface microstructures of the second, "high-silica mullite" ceramic body before heat-treatment, after heat-treating at 1500° C. for 8 hours, and after heat-treating at 1550° C. for 8 hours, respectively, as seen from the SEM images at a magnification of 3000×. FIGS. 5A, 5B, and 5C are the surface microstructures of the third, "low-silica mullite" ceramic body before heat-treatment, after heat-treating at 1500° C. for 8 hours, and after heat-treating at 1550° C. for 8 hours, respectively, as seen from the SEM images at a magnification of 3000×.

The as-prepared high-silica mullite and low-silica mullite materials, before heat-treating, were observed to have large alumina particles with mullite and silica material present in the interstitial regions. Heat treatment seemed to have removed the interstitial materials, and coarsened the grain features of the particles. The use of higher temperature for the heat treatment conditions greatly accelerated removal of the interstitial silica particles and coarsening of the grains.

Figure 6:
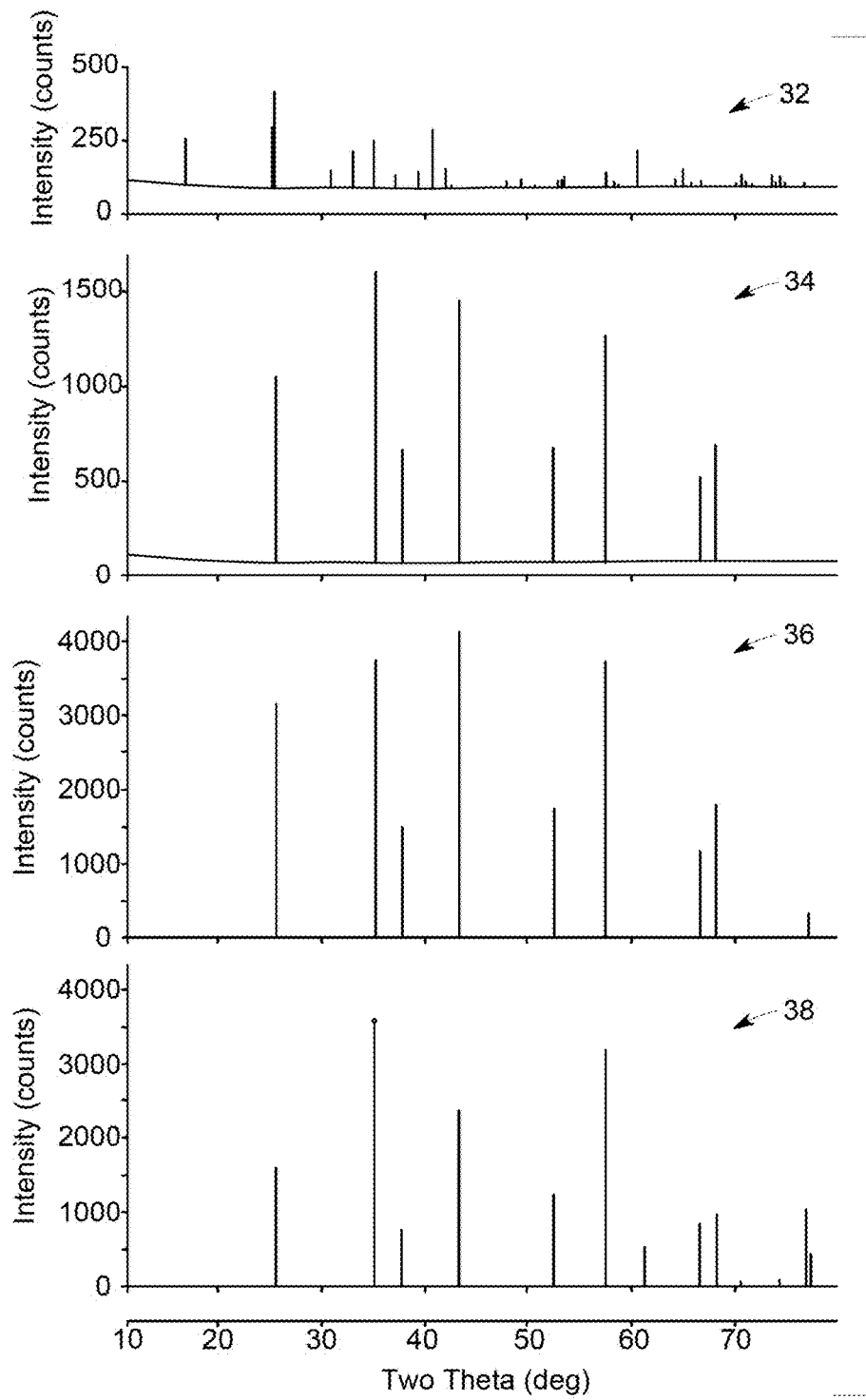
FIG. 6 shows X-ray diffraction (XRD) scans of the high-silica mullite composition at different heat treatment conditions compared with a standard alumina XRD pattern, in accordance with some embodiments of the present specification.
Figure 7A:
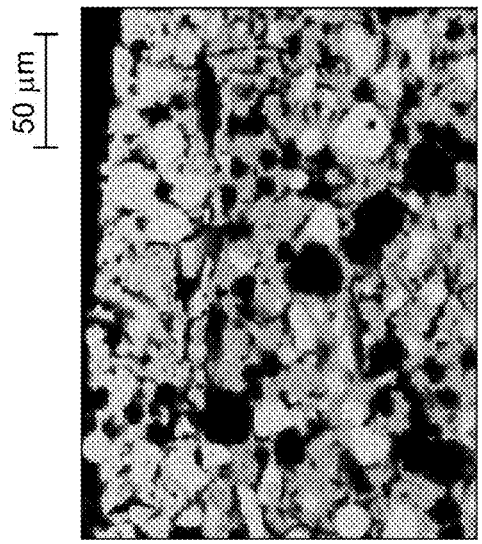
FIG. 7A shows an SEM image of a surface of the high-silica mullite ceramic body after heat-treating at 1550° C. for 8 hours, in accordance with some embodiments of the present specification.
Figure 7B:
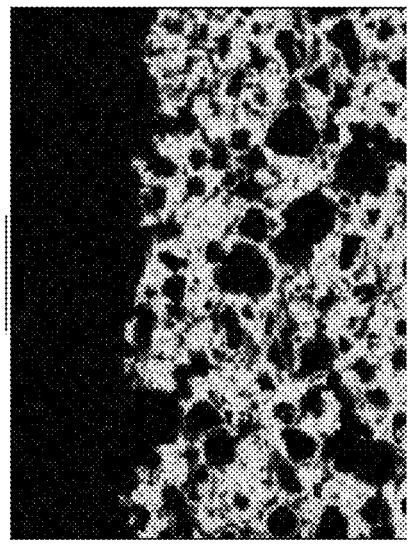
FIG. 7B shows an electron dispersive spectroscopy (EDS) image depicting aluminum measured along with the SEM image of FIG. 7A, in accordance with some embodiments of the present specification.
Figure 7C:
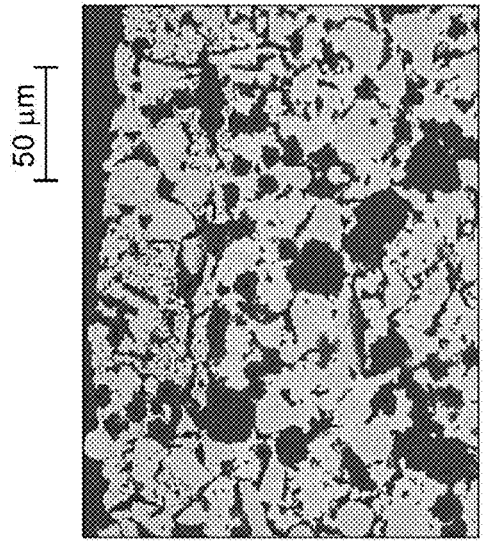
FIG. 7C shows an EDS image depicting oxygen measured along with the SEM image of FIG. 7A, in accordance with some embodiments of the present specification.
Figure 7D:
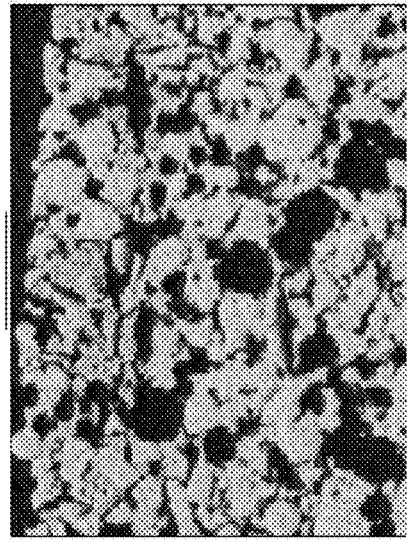
FIG. 7D shows an EDS image depicting silicon measured along with the SEM image of FIG. 7A, in accordance with some embodiments of the present specification.

FIG. 6 shows X-ray diffraction (XRD) scans of surfaces of the high-silica mullite composition at different heat treatment conditions compared with a standard alumina XRD pattern. XRD pattern 32 of the high-silica mullite sample before the heat treatment is compared with the XRD pattern 34 of the high-silica mullite sample heat-treated at 1500° C. for 8 hours and XRD pattern 36 of the high-silica mullite sample heat-treated at 1550° C. for 8 hours. Diffraction peaks corresponding to mullite and alpha-alumina can be clearly seen in the XRD pattern 32, while only alpha-alumina peaks were observed in the XRD patterns 34 and 36 as can be seen in comparison with the international centre for diffraction data (ICDD) of $\alpha$-$Al_2O_3$ depicted as pattern 38 in FIG. 6. This observation confirms that the mullite present on the surface of the high-silica mullite sample has been converted to alumina during the heat-treating and there is no mullite that is present on the surface of the high-silica mullite sample that is detectable by XRD. FIG. 7A shows SEM of surface of the high-silica mullite ceramic core after heat-treating at 1550° C. for 8 hours, corresponding to the XRD pattern 36 in FIG. 6. FIGS. 7B, 7C, and 7D are the corresponding EDS depictions of aluminum, oxygen, and silicon respectively. It can be observed that while the EDS of aluminum and oxygen depict the similar structure as in the overall SEM in FIG. 7A, silicon seems to be absent in the top surface (silica depletion zone) of the ceramic core. A thickness of at least 50 microns was found to be devoid of silicon when the FIG. 7D of the silicon EDS was compared to the SEM depicted in FIG. 3A. These XRD, SEM, and EDS results, combined with the mass loss and surface microstructure data discussed earlier on, show the efficacy of heat treatment to adjust the surface chemistry of the ceramic body to form a ceramic core that has a surface composition that is more resistant to chemical reduction.

Example 2

Similar first, second and third samples as used in Example 1 were subjected to a heat treatment in a vacuum furnace with molybdenum heating elements. The vacuum level was comparable to the experiments performed in Example 1. Table 2 compares the mass losses from the heat treatments in the two furnaces for the three ceramic bodies.

TABLE 2

Mass losses of different ceramic bodies after heat treatment in a furnace having graphite and molybdenum heating elements

| Sample | % mass loss after 1550° C./8 h in furnace having Graphite heating elements | % mass loss after 1550° C./8 h in furnace having Molybdenum heating elements |
|---|---|---|
| Silica | 20% | 0.1% |
| High-silica mullite | 11% | 0.1% |
| Low-silica mullite | 13% | 0.1% |

Mass loss was observed in furnaces having either of the heating elements, but there was considerably more mass loss in the heat treatment conducted in the furnace with graphite heating elements as compared to the heat treatment conducted in the molybdenum heating elements. This indicates that when starting from mullite-containing ceramic bodies, heat-treating in vacuum and in the presence of carbon is very effective for the formation of ceramic cores having a silica depleted outer zone.

It was further experimentally found that the mass loss from samples may be increased when the samples are heat-treated using the furnace having molybdenum elements by introducing a carbon source in the furnace during the heat-treating. This example shows the ability to tune the mass loss through control of the atmosphere, via the choice of heating elements and control of the carbon activity in the ceramic bodies in the furnace during the heat treatment.

While several aspects of the present specification have been described and depicted herein, alternative aspects may be effected by those skilled in the art to accomplish the same objectives. Accordingly, it is intended by the appended claims to cover all such alternative aspects as fall within the true spirit and scope of the present specification.

The invention claimed is:

1. A method for forming a ceramic core, the method comprising:
   heat-treating a sintered ceramic body comprising mullite in a non-oxidizing atmospheric condition for an effective temperature and time combination at a pressure less than $10^{-2}$ atmosphere to form a silica depletion zone at a surface of the ceramic core, wherein the sintered ceramic body further comprises alumina and free silica.

2. The method of claim 1, wherein the pressure of the non-oxidizing atmospheric condition is less than $10^{-3}$ atmosphere.

3. The method of claim 1, wherein a partial pressure of oxygen in the non-oxidizing atmospheric condition is less than $10^{-4}$ atmosphere.

4. The method of claim 1, wherein the non-oxidizing atmospheric condition comprises a reducing atmospheric condition.

5. The method of claim 4, wherein the reducing atmospheric condition comprises at least one of methane or hydrogen.

6. The method of claim 1, wherein heat-treating the sintered ceramic body comprises heat-treating in presence of carbon.

7. The method of claim 1, wherein the effective temperature of heat-treating the sintered ceramic body is greater than 1400° C.

8. The method of claim 7, wherein the effective temperature of heat-treating the sintered ceramic body is in a range from 1500° C. to 1700° C.

9. The method of claim 7, wherein an effective time duration of heat-treating the sintered ceramic body is greater than one hour.

10. The method of claim 1, wherein the method comprises forming the ceramic core in a monolithic form, wherein the monolithic form comprises a silica depletion zone encapsulating an inner zone, wherein the inner zone comprises alumina and mullite, and the silica depletion zone comprises alumina.

11. The method of claim 1, wherein the method further comprises:
    providing a slurry comprising a precursor of silica and at least one of alumina or a precursor of alumina;
    injecting the slurry into a die;
    curing the slurry in the die to form a cured ceramic body;
    separating the die and the cured ceramic body; and
    sintering the cured ceramic body to form the sintered ceramic body comprising mullite.

12. The method of claim 11, wherein the precursor of silica comprises siloxane binder.

13. The method of claim 11, wherein a temperature of sintering is greater than 1200° C.

14. A method comprising:
    providing a slurry comprising a precursor of silica and at least one of alumina or a precursor of alumina;
    injecting the slurry into a die;
    curing the slurry in the die to form a cured ceramic body;
    separating the die and the cured ceramic body;
    sintering the cured ceramic body to form the sintered ceramic body comprising mullite; and
    heat-treating the sintered ceramic body in a non-oxidizing atmospheric condition at a temperature greater than 1600 degree Celsius for a time duration greater than 2 hours at less than $10^{-3}$ atmosphere pressure to form a silica depletion zone encapsulating an inner zone comprising alumina and mullite.

15. The method of claim 14, wherein heat-treating the sintered ceramic body comprises heat-treating in presence of carbon.

16. The method of claim 14, wherein the precursor of silica comprises siloxane binder.

17. The method of claim 14, wherein a temperature of sintering is greater than 1200° C.

* * * * *